(No Model.) 2 Sheets—Sheet 1.
G. H. TIETJEN.
STENCILING MACHINE.
No. 452,624. Patented May 19, 1891.
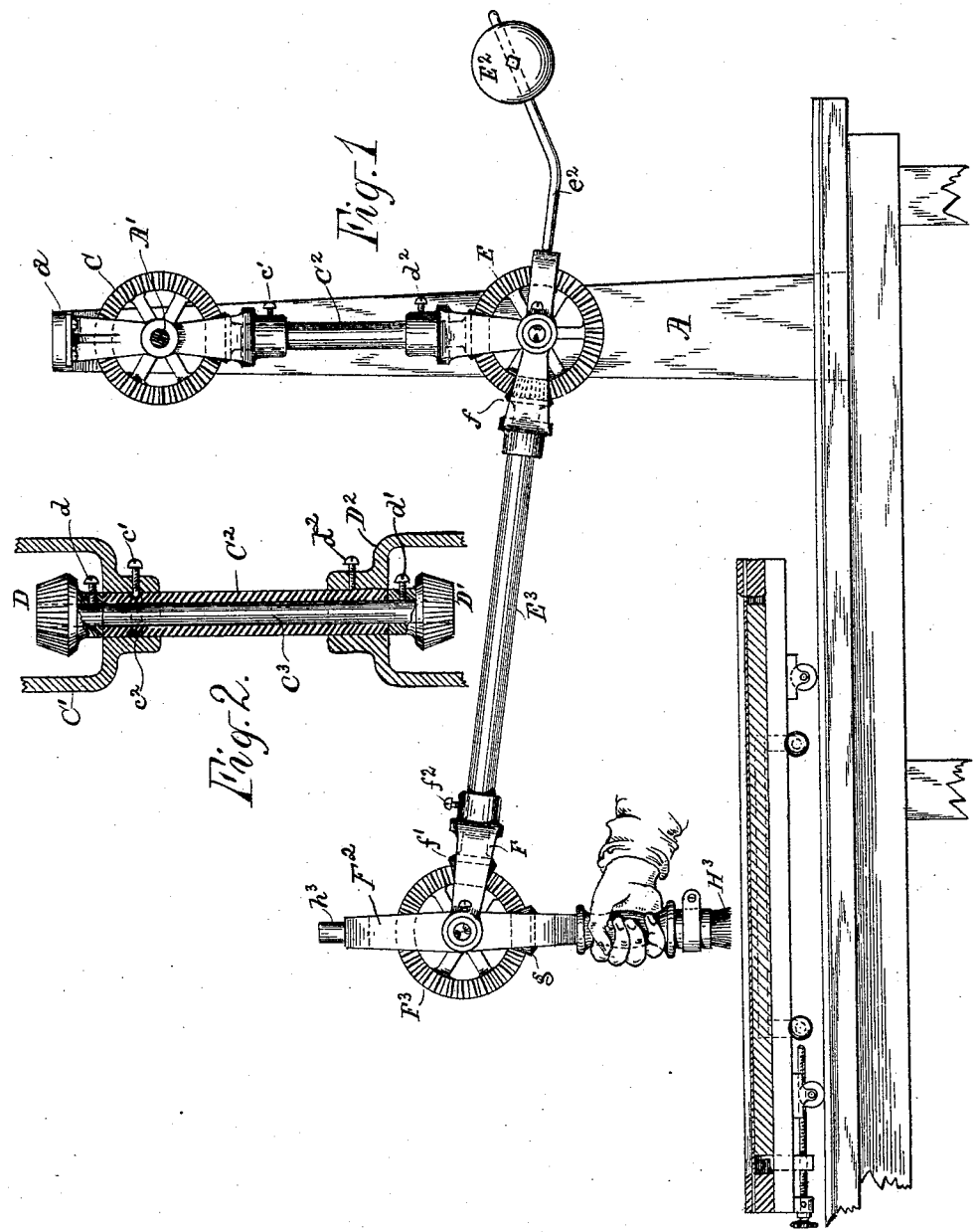

(No Model.) 2 Sheets—Sheet 2.
G. H. TIETJEN.
STENCILING MACHINE.
No. 452,624. Patented May 19, 1891.
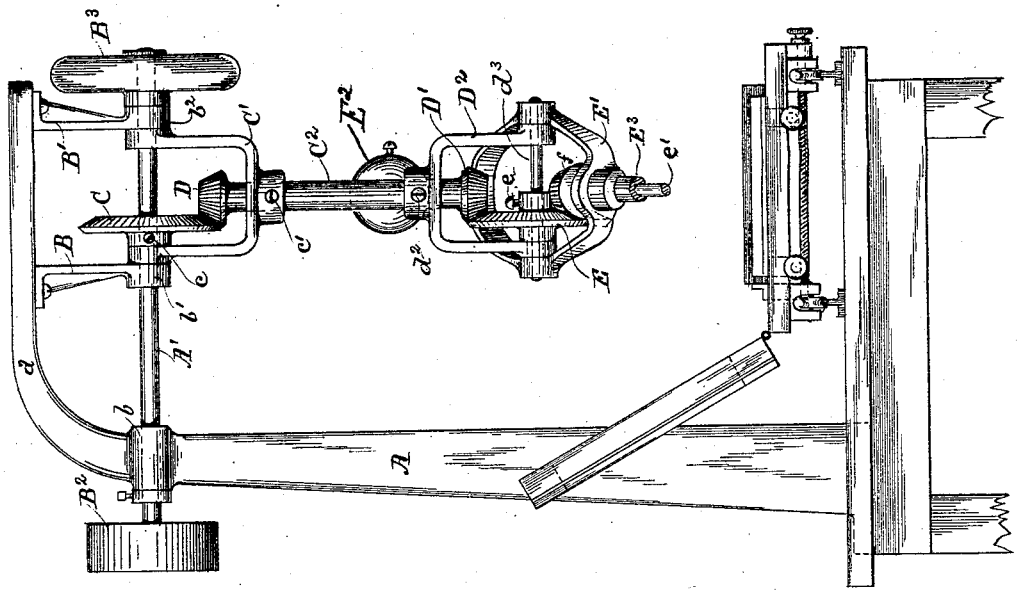
Fig. 3.
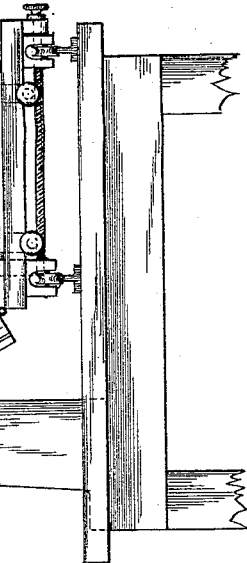
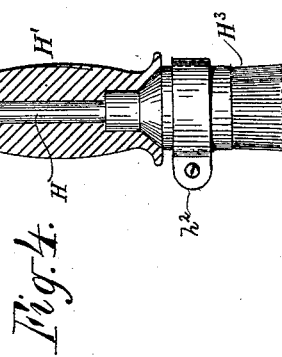
Fig. 4.
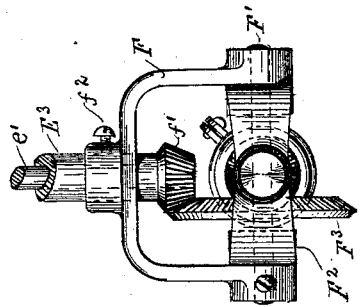
Fig. 5.
Witnesses.
H. Monteverde.
N. A. Acker
Inventor.
George H. Tietjen
By Boone & Acker

United States Patent Office.

GEORGE H. TIETJEN, OF SAN FRANCISCO, CALIFORNIA.

STENCILING-MACHINE.

SPECIFICATION forming part of Letters Patent No. 452,624, dated May 19, 1891.

Application filed May 2, 1890. Serial No. 350,306. (No model.)

*To all whom it may concern:*

Be it known that I, GEORGE H. TIETJEN, a citizen of the United States, residing in the city and county of San Francisco, and State of California, have invented certain new and useful Improvements in Sign-Stenciling Machines; and I do hereby declare the following to be a full, clear, and exact description of said invention, such as will enable others skilled in the art to which it most nearly appertains to make, use, and practice the same.

This invention has relation to certain new and useful improvements in sign-stenciling machines; and it consists of the parts and details of construction, as will be hereinafter more fully shown in the drawings, described, and pointed out in the specification.

The object of my invention is the provision of a machine for the mechanical stenciling of signs which shall be so constructed as to permit a rotary motion to be imparted to the stenciling-brush.

A further object consists in the provision of a machine which shall be simpler in its construction, less expensive, and more effectual in its operation than any device of a similar nature heretofore known to me.

Referring to the drawings, forming a part of this application, in which similar letters of reference are used to denote corresponding parts throughout the entire specification and several views of the drawings, Figure 1 is a side view in elevation; Fig. 2, a detail sectional view through the upper sleeve; Fig. 3, a front view showing the operating-brush, handle, and forwardly-extending sleeve removed; Fig. 4, an enlarged detail view of the stenciling-brush, handle, and supporting-bracket; Fig. 5, a top plan view of Fig. 4.

The letter A is used to indicate the frame of my machine, provided with the forwardly-extending arm $a$, and the letter A' represents the operating-axle, which is supported within the bearings $b\ b'\ b^2$, the latter two of which are formed within the downwardly-extending arms B B'. Said axle is operated by means of any suitable machinery acting upon the drive-wheel $B^2$, secured thereon. To the outer end of the axle I locate the balance-wheel $B^3$. I also secure upon said axle, between the arms B B', the bevel-gear C, by means of the securing screw or bolt $c$. Depending from this axle is the supporting-yoke C', to which is movably secured the downwardly-extending sleeve $C^2$ by means of the lug or screw $c'$. The upper end of the sleeve is provided with the annular groove $c^2$, within which the screw $c'$ enters. Within said sleeve passes or runs the operating-shaft $C^3$, to the upper and lower ends of which, respectively, are rigidly attached the pinions D D', by means of the screws $d\ d'$, as fully shown in Fig. 2. The upper pinion D meshes with the bevel-gear C, as shown in Fig. 3. It will thus be seen that by providing the annular groove $c^2$ in the upper end of the sleeve $C^2$, within which the screw $c'$ engages, I provide virtually a universal movement thereof.

To the lower end of the sleeve $C^2$, I rigidly attach the supporting-yoke $D^2$ by means of the screw $d^2$. The lower end of the supporting-yoke arms form bearings, through which the axle $d^3$ passes. Upon this axle I locate the bevel gear-wheel E, which engages or meshes with the pinion D'. This gear is secured by means of the screw $e$.

Upon the outer ends of the axle $d^3$ I mount the swinging bracket E'. From the rear of said bracket extends the rod $e^2$, which is provided with the adjustable counterbalance-weight $E^2$. Attached to and extending forwardly from said swinging supporting-bracket E' is the sleeve $E^3$, within which operates the rod $e'$. To the forward and rear end of said rod I rigidly secure the pinions $f\ f'$ by means of screws. (Not shown.) The pinion $f$ meshes with bevel-gear E, mounted upon the axle $d^3$.

To the outer end of the sleeve $E^3$, I attach the bracket or yoke F by means of the screw $f^2$, which works within an annular groove (not shown) similar to that formed in the upper end of sleeve $C^2$. Thus I provide for the easy turning or movement of the yoke upon the sleeve. The outer ends of the yoke-arms form bearings for the axle F', upon which works the brush-holder $F^2$. To said axle I secure the gear $F^3$, which meshes with the pinion $f'$ and pinion $g$, rigidly attached to the brush-operating rod H, which rotates within the handle H', which is, by means of screw $h$, secured to the sleeve portion $h'$ of the tool-holder. The stenciling-brush $H^3$ is rigidly attached to the lower end of the operating-rod H by means of the clamp $h^2$. It will thus be seen that the revolving of the axle A' carries therewith the gear C, which, meshing with pinion D, rotates the rod C³ within the sleeve C² and pinion D', which in turn, meshing with gear E, operates the same, so as to transmit motion to pinion f, with which it engages. Said pinion being secured to rod e', working in sleeve E³, necessarily rotates the same and pinion f', attached to its forward end, and through the medium thereof operates the gear F³, and at the same time pinion g, with which it engages, thereby causing the rotation of the operating-shaft H and stenciling-brush H². By making or providing a series of universal joints I allow for the turning or movement of the stenciling-brush in any desired position.

In Fig. 1 I have shown the stenciling-brush above the stencil-holding case. However, if so desired, a second brush may be attached to the upper portion h³ of the holder-support, thereby allowing for use of different-colored paints.

By the use of my device the lettering is accomplished in a quicker time than can be accomplished by hand, and at the same time in a more uniform order—that is, the paint is evenly placed upon each letter of the stencil.

I am aware that minor changes may be made in the arrangement of parts and details of construction herein shown and described without causing or necessitating a departure from the nature and scope of my invention.

Having thus described my invention, what I claim as new, and desire to secure protection in by Letters Patent of the United States, is—

1. In a sign-stenciling machine, the combination of a driving-shaft having a gear mounted thereon, a vertical shaft provided at opposite ends with pinions, a sleeve incasing said shaft and provided at one end with an annular groove, upper and lower brackets provided with collars surrounding the shaft, and a screw passing through said collar into the annular groove, and mechanism coacting with the lower pinion of the vertical shaft, whereby the stencil-brush is operated, substantially as set forth.

2. The combination, in a paint-stenciling machine, of the frame, depending arms secured thereto, rotating axle having bearings within the arms and frame, drive-wheel attached to the axle, operating-gear located thereupon, supporting-yoke depending therefrom, movable sleeve secured within the yoke, operating-rod passing therethrough having upper and lower pinion secured thereon, yoke suspended from said sleeve, axle passing through the arms thereof, gear-wheel secured to said axle, supporting-bracket movably secured thereto, counterbalance-weight located upon the rearwardly-extending rod, forwardly-extending sleeve, operating-rod passing therethrough, pinions attached to the forward and rearward end of said rod, yoke movably attached to the forward end, supporting-holder and gear located upon axle passing through said yoke, handle attached to the holder, operating-rod having a pinion at its upper end passing through said handle, and of the stencil-brush attached to the operating-rod and adapted through the working thereof to have a rotary motion imparted thereto, substantially as set forth and described.

3. In a sign-stenciling machine, the combination, with the herein-described mechanism, of the forwardly-extending sleeve, operating-rod located therein, pinions attached to said rod, forwardly-extending yoke secured to the outer end of the sleeve, axle having bearing within the yoke-arms, gear located upon said axle, supporting-holder working thereon, handle attached to said holder, operating-rod having pinion secured thereon passing therethrough, and of the rotating stencil-brush secured thereon, substantially as and for the purpose set forth and described.

4. In a sign-stenciling machine, the combination of the herein-described operating mechanism, a forwardly-extending sleeve provided at one end with an annular groove, operating-rod passing through said sleeve provided at opposite ends with pinions, a yoke provided with a rearwardly-extending collar surrounding the forward end of the sleeve, a screw passing through said collar and into the annular groove of the sleeve, means for rotating the sleeved rod, operating-handle, and brush, and means for operating the latter through the medium of the sleeved rod and suitable gearing, substantially as set forth.

5. In a sign-stenciling machine, the combination of the sleeved shaft provided upon opposite ends with pinions, a yoke secured to the forward end of the sleeve of said shaft, an axle journaled therein, said axle having a beveled gear mounted thereon, a brush-holder turning upon the ends of said axle, said holder formed with a depending sleeved portion, a tubular handle, a screw for securing said handle to the sleeves, an operating-rod passing through the handle and support and provided upon its upper end with a beveled pinion meshing with the pinion of the shaft, a stencil-brush, a clamp for securing the same to the operating-rod, and means for rotating the sleeved shaft, substantially as set forth.

6. In a sign-stenciling machine, the combination, with the herein-described mechanism for imparting rotary motion to the stencil-brush, of the handle-support movably secured upon the axle F' and adapted to receive handle and brush at each end thereof, substantially as set forth and described.

In testimony whereof I affix my signature in the presence of witnesses.

GEORGE H. TIETJEN.

In presence of—
N. A. ACKER,
J. H. BLOOD.